Nov. 24, 1931.  J. G. BAUMBACH  1,833,452
WORM GEAR OPERATING MEANS FOR AWNINGS
Filed Jan. 29, 1931  2 Sheets-Sheet 1
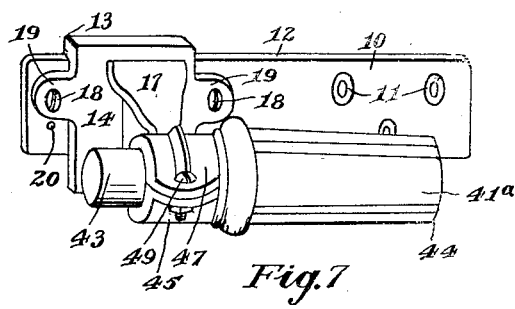
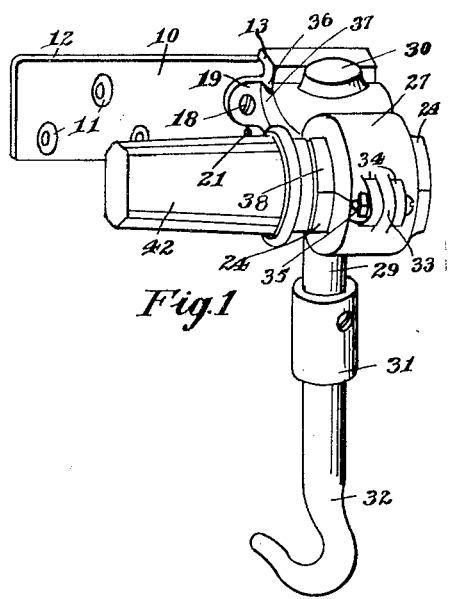
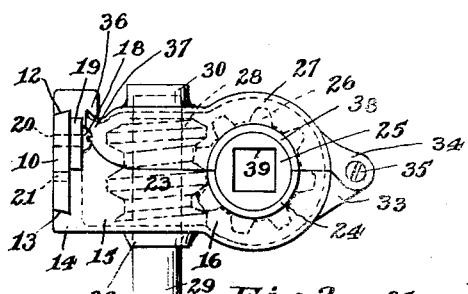
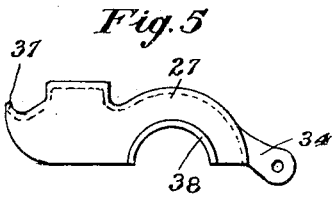
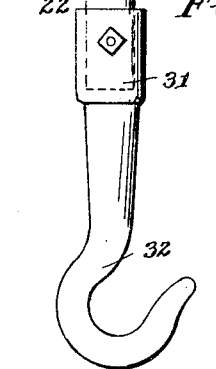
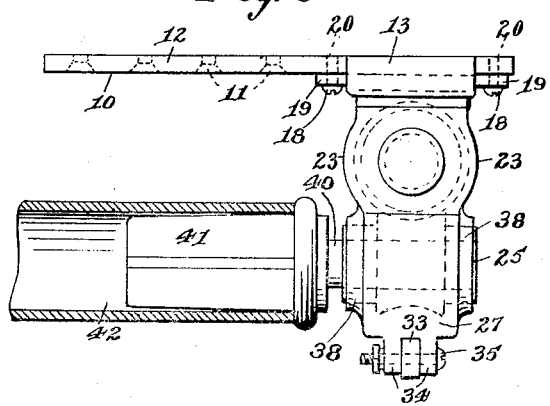
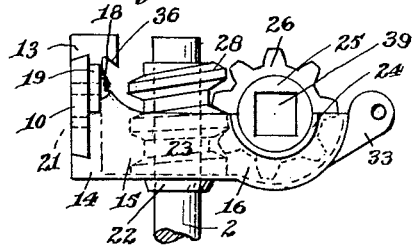
INVENTOR.
John G. Baumbach
BY
Chamberlain & Newman
ATTORNEYS.

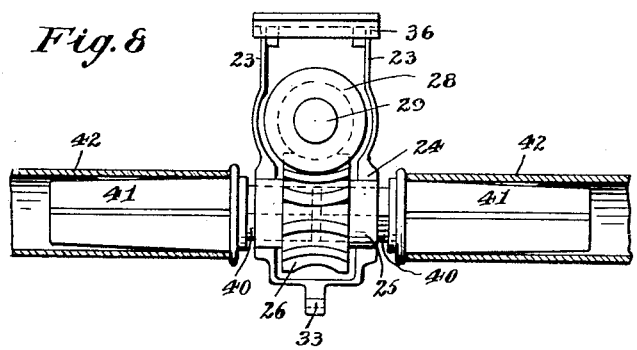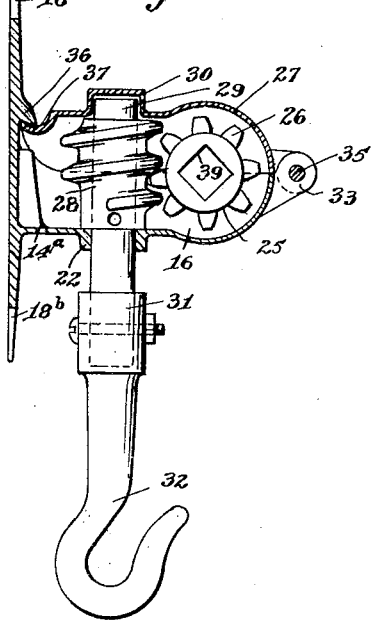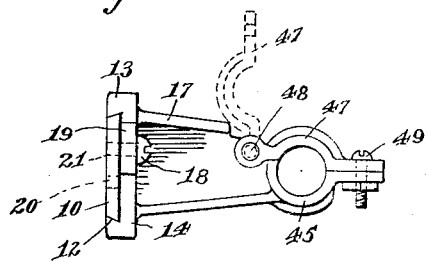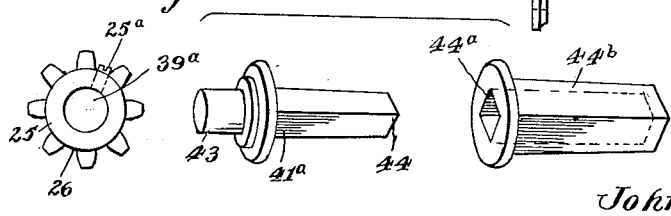

Patented Nov. 24, 1931

1,833,452

UNITED STATES PATENT OFFICE

JOHN G. BAUMBACH, OF SOUTH NORWALK, CONNECTICUT

WORM GEAR OPERATING MEANS FOR AWNINGS

Application filed January 29, 1931. Serial No. 512,065.

The present invention relates to awning fixtures and more especially to awning roller operating means, including a combined roller bracket and worm and gear housing as employed in connection with awning rollers, for rolling up, running out and supporting the same.

It is the object of my invention to provide an improved form of combined roller bracket and worm and gear housing, for the purpose specified, which may be used as a right or left so-called, for operatively supporting either end of an associated roller. Further to provide a housing which is so constructed that rain water and the like will not get in and become frozen or rusted and prevent the easy operation of the worm and gear.

A further feature of the invention is to provide a two-part bracket, including a lower and upper member, the lower bracket being adapted to form a support for the roller and the worm and gear operating means, and the upper member as a cover or closure member adapted to be attached and secured in position to the lower member by a single screw so as to permit the cover to be readily detached should occasion require.

My invention is adapted to be employed as a right or left form of bracket, and may be used as a support for the end of the roller distant from the worm and gear, through which the roller is operated.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows a perspective view of my improved form of worm and gear housing, including an attached supporting plate, bushing and shaft hook;

Fig. 2 is an end view of the device as seen from the left in Fig. 1, the bushing 41 being omitted;

Fig. 3 is a top plan view of the invention as shown in Fig. 1, with the near end portion of a roller shown attached;

Fig. 4 is a side view corresponding in part with Fig. 2 though having the detachable cover removed;

Fig. 5 is a side elevation of the cover as removed from Fig. 4;

Fig. 6 shows a plan view of the worm gear shown in Fig. 4;

Fig. 7 shows a perspective view in operative alignment with Fig. 1 of an adjustable bracket, for supporting the bushing that carries the end of the roller farthest from the operating gears;

Fig. 8 is a plan view of a slightly modified form of awning roller operating means, with housing cover removed and showing two aligned bushings and rollers attached.

Fig. 9 is a central vertical section of the awning roller operating means shown in Fig. 8;

Fig. 10 shows an end view of a modified form of worm gear, a perspective view of a connectible bushing and a similar view of an associated sleeve or connection for roller.

Fig. 11 shows an unattached side elevation of the roller bracket shown in Fig. 7; and Fig. 12 is a side view of a modified form of awning roller bracket for the idle end of the awning roller.

Referring in detail to the characters of reference marked upon the drawings, 10 represents a plate which is provided with a series of screw holes 11, in one end portion, adapting it for attachment to the upper horizontal frame portion of a store window or other suitable part of a building. These plates are usually secured adjacent to the upper corner portions of a window, and being reversible, can be applied, as to bring the holes of their supporting gears in alignment with either side of the window frame, and which in some instances may be the side frame between two windows. The plates 10 shown in Figs. 1 and 7 are alike though in a reversed, end for end, position so that the roll supporting bracket may be positioned upon the outer ends of the plate above and substantially in alignment with the vertical portions of a window frame. This plate is adapted to support different styles of roller brackets as shown in Figs. 1 and 7.

The horizontal edge portions 12—12 of this plate are beveled, as shown, to engage the dove-tailed guideways 13, of the base 14 of either the bracket 15 including the lower housing 16 or the bracket 17 shown in Figs. 7 and 11. These brackets are adapted to be attached to one end of the plate in a reversible position and secured thereto by means of screws 18 positioned in ears 19 of the base and adapted to engage the two upper aligned threaded holes 20 or 21 in the end of the plates according to which side of the window frame the plate is attached. This lower member of the housing bracket, aside from the base 14, is dish-like in form to accommodate the worm and gear and includes a bottom portion having a vertical hole therethrough forming a bearing 22 for the worm gear operating shaft. It further includes substantially parallel side portions 23—23 having aligned bearing 24 in which the hubs 25 of the worm gear 26 are journaled. This housing member together with the housing cover 27 inclose the worm and gear, together with a lubricant in which they operate.

The worm 28 is mounted upon a short shaft 29 journaled in aligned bearings 30 and 22 of the upper and lower housing members respectively and is provided with a coupling 31 by means of which the shaft hook 32 is attached thereto. The lower member is further provided with an ear 33 to which the upper or cover housing member 27 is secured. The upper housing member is provided with two ears 34 which are formed in spaced relation to receive therebetween the ear 33 of the lower housing member. The three said ears are provided with aligned holes in which the fastening or locking screw 35 is positioned.

A horizontally disposed inclined shoulder 36 is provided along the upper portion of the base of the bracket to receive the correspondingly shaped horizontal edge portion 37 of the rear end of the upper housing member 27 so as to provide attaching means for that end of the housing and whereby when the same is closed it can be securely fastened by means of the one screw 35. Aligned circular bearing portions 38 are also provided in the under side of this top housing member to register with those of the lower member and to accommodate and form complete bearings for the hubs 25 of the gear 26. It will be noted that by this form of separable housing a relatively tight fit for the parts and lubricant is produced and water thereby prevented from entering, to freeze and rust the operative parts therein.

The worm gear 26 is preferably provided with a square hole 39 therethrough to accommodate the square end 40 of the bushing 41 upon which one end of the awning roller 42 is positioned. The other end of the roller is in a like manner supported on a somewhat similar bushing 41a, having a round pintle end 43 (see Fig. 7). The shouldered end 44 of this bushing 41a like the shoulder of the bushing 41, is adapted to be inserted in one end of the tubular awning roller 42 in a way to frictionally engage the same to insure the turning of the roller with the bushing and by the action of the worm and gear for raising and lowering the awning. The round pintle end 43 as shown on the bushing in Fig. 7 serves to support the idle end of a roller in the bearing 45 of the bracket 17 as shown in Fig. 7. This bracket is provided with a vertically disposed elongated base 46, see Fig. 12, for attachment to the vertical sections of a store front, or its base may be provided with horizontal guideways 13, see Figs. 7 and 11, to receive the plate 10 upon which it is positioned and secured, as in the case of the worm gear housing. If the bracket is formed as shown in Fig. 11, ears 19—19 would be used to receive screws 18 for its attachment to the plate. By this latter form of construction it will be apparent that the bracket is reversibly attached to the plate 10 and, like the housing bracket, can be used as a right or left. The bearing of this bracket is provided with a hinged cover 47 that is hingedly attached as at 48 to the bracket and is adapted to be secured down in position by screw 49.

The construction shown in Figs. 8 and 9, is called a vertical bracket, that is a worm and gear bracket that is especially adapted for direct attachment to the vertical members of a window frame or other portion of a building, and as will be seen, instead of the detachable plate 10 shown in Figs. 1 and 2, it includes an integral elongated flat base 14a that extends vertically above and below the housing and is provided with a screw hole 18a and a slot 18b to receive screw bolts for its attachment to a building. As shown in these figures this bracket is adapted to receive two aligned bushings 41 to connect and operate two aligned awning rollers, or it may be used for a single roller as in the case of the bracket shown in Fig. 1.

In Fig. 10 I have shown a modified form of roller supporting means which is adapted for a worm gear having a round hole 39a instead of a square hole and in which case the bushing 41a is provided with a round end 43 for positioning in the hole 39a of the gear and secured therein by a pin 25a. The other end of this bushing is square to engage the square hole 44a in one end of a sleeve 44b and whose other end portion is shaped to enter and engage an awning roller as in the case of the construction shown in the preferred forms.

In the operation of the worm and gear, as illustrated herein, it is customary for the operator to use a rod having a hook or an eye, not shown, upon its upper end, for engagement with the hook 32 shown herein and thereby to turn the rod to the right or left as may be necessary to raise or lower the awning.

Having thus described my invention, what I claim and desire to secure by Letters Patent, is:

1. In a worm and gear operating means for awnings, the combination of a housing member having two aligned bearings, a worm journaled in the housing, a gear meshing with the worm and having annular hubs on each side thereof for rotation in the bearings of the housing and having an opening therethrough for the connection and operative support of an awning roller, a detachable cover having aligned bearings for the hubs of the gear and a closed bearing for the worm and screw means for securing the cover in position.

2. In a worm and gear operating means for awnings, the combination of a housing member having aligned transverse bearings and a transverse shoulder, a worm journaled in the housing, a gear meshing with the worm and having annular hubs on each side thereof for rotation in the bearings of the housing and having an opening therethrough for the connection and operative support of an awning roller, a detachable cover one end of which is adapted to engage the said shoulder and having bearings for the said worm and gear, and screw means for securing the other end of the cover in position.

3. In a worm and gear operating means for awnings, the combination of a housing member having aligned transverse bearings, a worm journaled in the housing, a gear meshing with the worm and having annular hubs on each side thereof for rotation in the aligned bearings of the housing and having an opening therethrough for the connection and operative support of an awning roller, a connectible bushing including an annular flange, and having a rounded end portion and a square end portion for engagement with the gear and awning roller, a detachable cover having bearings for both the said worm and gear, and screw means for securing the cover in position.

4. In a worm and gear operating means for awnings, the combination of a housing member having two bearings, one at right angles to the other, and a transverse shoulder, an operating shaft journaled in one of the said bearings, a worm upon the shaft, a gear meshing with the worm and having annular hubs on each side thereof for rotation in the bearing of the housing and having an opening therethrough for connection and operative support of an awning roller, a detachable cover having bearings for both the said worm shaft and gear, and an edge across one end portion to engage the shoulder, the said worm shaft bearing being a closed bearing to entirely cover and enclose the end of the said shaft, and means for securing said cover in position.

Signed at South Norwalk in the county of Fairfield and State of Connecticut this 26 day of January, A. D. 1931.

JOHN G. BAUMBACH.